United States Patent
Zhang

(10) Patent No.: US 9,894,520 B2
(45) Date of Patent: Feb. 13, 2018

(54) CACHE-BASED WIRELESS CLIENT AUTHENTICATION

(71) Applicant: Fortinet, Inc., Sunnyvale, CA (US)

(72) Inventor: Yong Zhang, Belmont, CA (US)

(73) Assignee: Fortinet, Inc., Sunnyvale, CA (US)

(*) Notice: Subject to any disclaimer, the term of this patent is extended or adjusted under 35 U.S.C. 154(b) by 0 days.

(21) Appl. No.: 14/494,844

(22) Filed: Sep. 24, 2014

(65) Prior Publication Data

US 2016/0088475 A1    Mar. 24, 2016

(51) Int. Cl.
| | |
|---|---|
| *H04W 12/06* | (2009.01) |
| *H04L 29/12* | (2006.01) |
| *H04L 29/06* | (2006.01) |
| *H04W 12/08* | (2009.01) |
| *H04W 36/00* | (2009.01) |
| *H04W 84/12* | (2009.01) |

(52) U.S. Cl.
CPC ......... *H04W 12/06* (2013.01); *H04L 61/1523* (2013.01); *H04L 61/6022* (2013.01); *H04L 63/0876* (2013.01); *H04W 12/08* (2013.01); *H04W 36/0038* (2013.01); *H04W 84/12* (2013.01)

(58) Field of Classification Search
CPC .......................... H04W 12/06; H04N 21/6334
USPC ........................................ 726/8, 26; 370/248
See application file for complete search history.

(56) References Cited

U.S. PATENT DOCUMENTS

| | | | |
|---|---|---|---|
| 6,606,663 B1* | 8/2003 | Liao et al. | 709/229 |
| 8,417,951 B2* | 4/2013 | Zhang et al. | 713/170 |
| 2007/0209081 A1* | 9/2007 | Morris | 726/29 |
| 2016/0087954 A1 | 3/2016 | Zhang | |

OTHER PUBLICATIONS

Zhang et al. (A New Authentication and Key Management Scheme of WLAN, IEEE, 2006, 5 pages).*
Non-Final Rejection for U.S. Appl. No. 14/658,203 dated Oct. 1, 2015.
Final Rejection for U.S. Appl. No. 14/658,203 dated Mar. 11, 2016.
Appeal Brief for U.S. Appl. No. 14/658,203 dated Nov. 11, 2016.
Examiner's Answer to Appeal Brief for U.S. Appl. No. 14/658,203 dated Feb. 7, 2017.

* cited by examiner

*Primary Examiner* — Oleg Korsak
(74) *Attorney, Agent, or Firm* — Hamilton, DeSanctis & Cha LLP

(57) ABSTRACT

Methods and systems for caching of remote server MAC authentication to enable fast roaming are provided. According to one embodiment, a wireless network controller of a wireless local area network (WLAN) receives an authentication request relating to a wireless client device from a wireless access point (AP) managed by the wireless network controller. It is determined whether a prior authentication result associated with the client is present in a cache of the controller. The client is permitted to access the WLAN via the AP when the prior authentication result is present and indicates the client was previously successfully authenticated. The authentication request is issued to a remote authentication device associated with the WLAN to determine a current authentication status of the client. Responsive to receipt of the current authentication status, information regarding the current authentication status is stored by the controller within the cache.

13 Claims, 7 Drawing Sheets

CACHE-BASED WIRELESS CLIENT AUTHENTICATION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2014, Fortinet, Inc.

BACKGROUND

Field

Embodiments of the present disclosure generally relate to wireless computer networks. In particular, systems and methods of the present disclosure relate to fast and efficient Media Access Control (MAC) authentication of wireless client devices to reduce delays when such client devices roam to new wireless access points (APs), for example.

Description of the Related Art

With a growing number of wireless devices such as laptops, tablets, mobile phones, and PDAs being used by users, enterprise networks have increased their focus on wireless access to these devices using wireless access points (APs). In order to serve these wireless devices, enterprises usually setup wireless local area networks (wireless LANs, or WLANs) having several access points (APs) installed at different places throughout the campus area, wherein such WLANs have changed the landscape of computer networking in recent past and will need to continue to evolve to meet the growing needs of the industry. Wireless technology, which enables provision of continual network connections without having to "plug in" or physically connect a user/computing/client device, has resulted in a more flexible access to enterprise networks.

In a typical enterprise setup, there may be several APs installed throughout the enterprise network (which may be referred to as a WLAN) to provide access to information/data to client devices connected from within the enterprise network or from outside the enterprise network. A WLAN allows end users/client device to access a corporate intranet and/or the Internet to manage e-mails, schedule meetings, and access files and applications/resources on the corporate or university or enterprise network from anywhere such as from conference rooms, classrooms, co-workers' desks, the cafeteria or virtually from anywhere within the campus. To manage these APs and/or to grant access to the device connecting through the APs, a centralized network controller is typically configured, wherein one or more APs connect to the centralized network controller to authenticate client devices that are connected to (or are attempting to connect to) the enterprise network using the APs. A user device may be authenticated by the controller itself or indirectly by the controller by way of another authentication server, such as a Lightweight Directory Access Protocol (LDAP) server, a Remote Authentication Dial In User Service (RADIUS) server, a Terminal Access Controller Access-Control System (TACACS) server or any other remote authentication server, that is operatively connected with the controller that may be responsible for authenticating client devices.

With the increasing use and interest by end users in having network connectivity using WLANs, existing businesses/enterprises are more concerned about network security. With a WLAN, transmitted data is broadcasted over the air using radio waves that may sometime also be captured by the hackers and malicious users from nearby localities. This means that any wireless client device within coverage area of an AP can receive data transmitted to or from the AP, which poses a security risk to the network. Because radio waves travel through ceilings, floors, and walls, transmitted data may reach unintended recipients on different floors or even outside the building that houses the AP. Without stringent security measures in place, installing a WLAN and associated APs can be a potential security threat to the enterprise IT infrastructure and IT security.

Existing WLAN security measures include the use of Service Set Identifiers (SSIDs) using open or shared-key authentication, static Wired Equivalent Privacy (WEP) keys, and optional Media Access Control (MAC) authentication. These techniques, individually or in combination, offer a certain level of access control and privacy, but each of these has its own weakness that can be exploited by a malicious user.

To provide adequate security to these WLANs, the Institute of Electrical and Electronics Engineers Inc. (IEEE) created a 802.11 standard for WLANs that supports two means of client authentication, namely Open and Shared-Key authentication. Open authentication involves little more than supplying the correct SSID. With shared-key authentication, on the other hand, an AP sends a client device a challenge text packet that the client must then encrypt with the correct WEP key and return to the AP. If the client has the wrong key or no key, authentication will fail and the client will not be allowed to access the WLAN via the AP. Shared-key authentication is not considered secure, because a hacker who detects both the clear-text challenge and the same challenge encrypted with the WEP key, can decipher the WEP key. By combining open authentication with shared-key authentication, even if a client can complete authentication and connect to an AP, the use of WEP prevents the client from sending data to and receiving data from the AP, unless the client has the correct WEP key.

It has been recognized that vulnerabilities exist in the authentication methods and data privacy schemes provided by 802.11. To end that, IEEE has adopted 802.1X as a new standard for session authentication on wired and wireless networks. This standard can provide WLANs with strong, mutual authentication between a client and an authentication server. There are several authentication methods provided by 802.1X, each providing a different approach of authentication while relying on the same framework and the Extensible Authentication Protocol (EAP) for communication between a client and an AP.

A mutual authentication is implemented between a client and an authentication server, such as a RADIUS or LDAP server. In order to authenticate a client device, user credentials, such as username and password, are sent by the client device to the authentication server using suitable encryption techniques each time a client device connects to a new AP. Generally, a wireless client device, such as a laptop, a mobile phone, or a tablet discovers APs by passively monitoring beacons or through active probing. Once the client device tries to connect with an AP, if the AP is secured using any one of the 802.1X authentication methods, the AP starts the authentication process for the client device and sends a request to the authentication server. Upon successful authentication by the authentication server, the AP establishes a secured connection with the client device.

In some authentication scenarios, a client's MAC address can be used to authenticate the client device for access to the AP and the enterprise network. As described above, MAC authentication can be done locally on the controller or using a remote authentication server, such as a RADIUS or LDAP server. A client device may be authenticated only on the basis of the MAC authentication or the authentication may be combined with other authentication methods to grant access to the enterprise/secure network. When a remote server is used for MAC authentication, extra delays are introduced, which can result in negative impact on time sensitive applications, such as voice and video, when a client roams from one AP to another AP.

These above described methods work relatively better for static wireless clients that connect mostly with the same AP and do not roam around trying to connect with different APs at different times. Roaming client devices, in contrast, must endure the authentication process each time they attempt to make a connection with a new AP. Delay is introduced as a remote authentication server needs to be consulted with each time the authentication process is carried out, thereby decreasing efficiency and reducing the perceived quality of the connection to the WLAN. Therefore, while the current key management schemes, as described above, provide increased security, they lack the required elements for optimizing transition of a wireless client device as it roams and moves from one AP to another. Real-time devices, such as mobile phones, require the ability to seamlessly roam with little or no disruption. Using existing authentication techniques, if a user moves from one AP to another, a handshake takes place between the new AP and the controller to re-authenticate the user's wireless device. This handoff from one AP to another and re-authentication process results in delays, and such delays can, in some cases, compromise or disrupt real-time applications/services (e.g., voice services, video services and/or financial trading applications) in use by user devices during the time period in which the handoff and authentication processing is being performed.

There is, therefore, a need for methods and systems that provide faster wireless client device authentication that enables seamless roaming among APs of a WLAN with little or no disruption to real-time services.

SUMMARY

Methods and systems are described for reducing delays associated with Media Access Control (MAC) based authentication of wireless client devices. According to one embodiment, a method of performing a cached-based, local client device authentication is provided. A wireless network controller of a wireless local area network (WLAN) receives an authentication request relating to a wireless client device from a wireless access point (AP) managed by the wireless network controller. It is determined by the wireless network controller whether a prior authentication result associated with the wireless client device is present in a cache of the wireless network controller. The wireless client device is permitted by the wireless network controller to access the WLAN via the AP when the prior authentication result is present and indicates the wireless client device was successfully authenticated. The authentication request is issued by the wireless network controller to a remote authentication device associated with the WLAN to determine a current authentication status of the wireless client device. The current authentication status of the wireless client device is received by the wireless network controller from the remote authentication device. Information regarding the current authentication status is stored by the wireless network controller within the cache.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
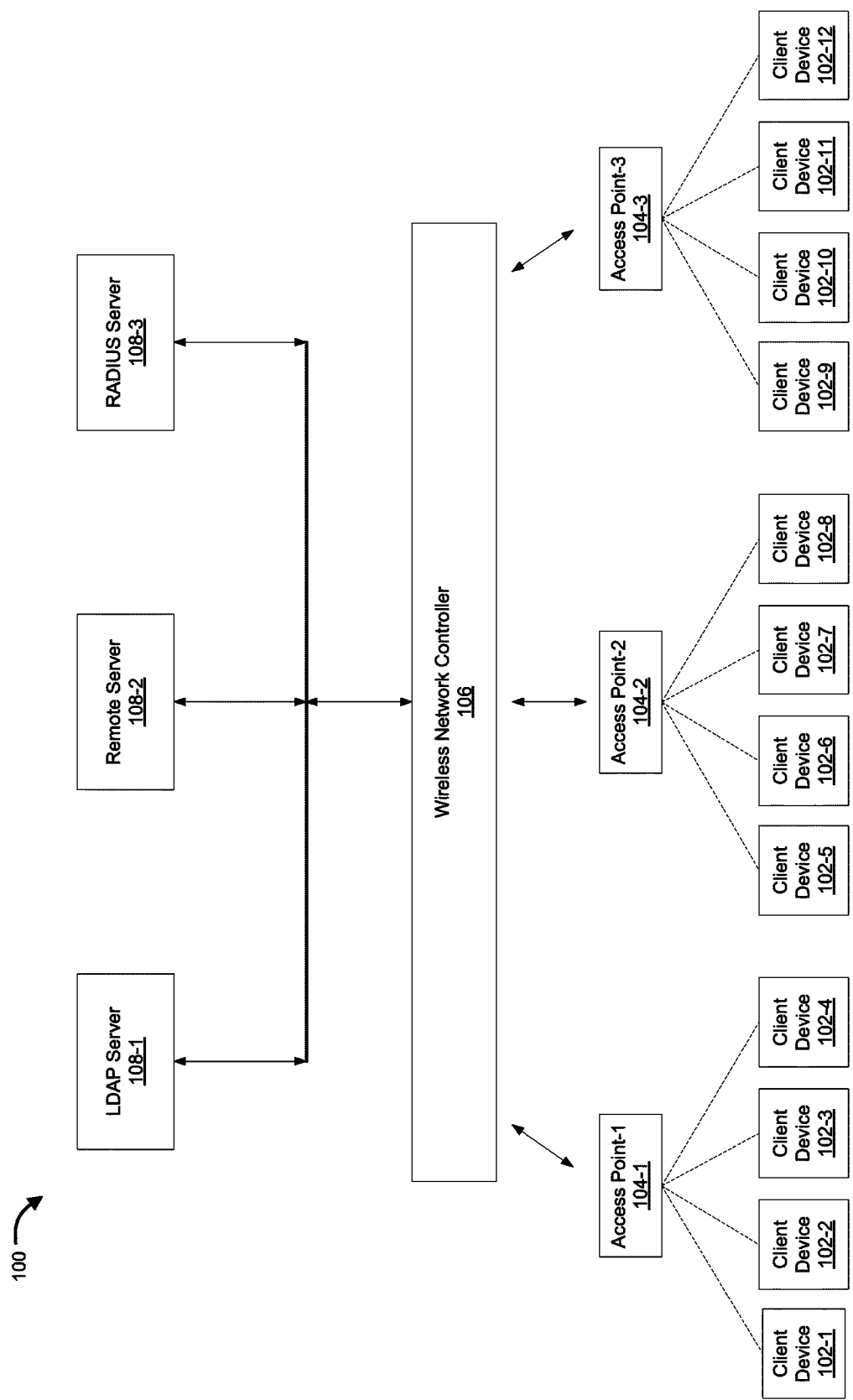
FIG. 1 illustrates an exemplary network architecture in which embodiments of the present disclosure can be implemented.

Methods and systems are described for reducing delays associated with Media Access Control (MAC) based authentication of wireless client devices. Methods and systems are also described for caching of authentication status of wireless client devices at network controllers to enable fast roaming. Systems and methods are furthermore described for caching of authentication status of wireless client devices, as received from remote authentication device(s), at a network controller, wherein the network controller may use the cached authentication for providing temporary authentication to one or more client devices that are trying to access a secured network resource through one or more APs.

In the following description, numerous specific details are set forth in order to provide a thorough understanding of embodiments of the present disclosure. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose authenticating wireless client devices for accessing wireless network(s), it should be appreciated that the same has been done merely to illustrate the disclosure in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this disclosure. Those of ordinary skill in the art further understand that the exemplary hardware, software, processes, methods, and/or operating systems described herein are for illustrative purposes and, thus, are not intended to be limited to any particular named.

Aspects of the present disclosure provide a method that receives, by means of a wireless network controller of a wireless local area network (WLAN), an authentication request relating to a wireless client device from a wireless access point (AP) managed by the wireless network controller. Based on the received authentication request, the wireless network controller determines whether a prior authentication result associated with the wireless client device is present in a cache of the wireless network controller, and permits the wireless client device to access the WLAN via the AP when the prior authentication result is present and the prior authentication result indicates that the wireless client device was previously successfully authenticated. The wireless network controller can then issue/forward the authentication request to a remote authentication device associated with the WLAN to determine a current authentication status of the wireless client device and receives the current authentication status of the wireless client device from the remote authentication device to store/update the status within the cache.

In an embodiment, when the current authentication status received from the remote authentication device represents a successful authentication of the wireless client device, the network controller can continue to allow the wireless client device to access the WLAN via the AP. When the current authentication status represents an unsuccessful authentication of the wireless client device, then the network controller can revoke access to the WLAN by the wireless client device via the AP.

According to one embodiment, when the prior authentication result is not present in the cache of the network controller, the controller can be configured to issue the authentication request to the remote authentication device to determine the current authentication status of the wireless client device and can delay permission/denial of access to the WLAN by the wireless client device until after a response to the authentication request is received from the remote authentication device. In an aspect, after a defined time interval, the network controller can receive the current authentication status of the client device from the remote authentication device and permit the wireless client device to access the WLAN via the AP when the current authentication status indicates that the wireless client device was successfully authenticated. On the other hand, if the current authentication status indicates that the wireless client device was unsuccessfully authenticated, the wireless network controller can be configured to deny the wireless client device to access the WLAN via the AP. The wireless network controller can also store the current authentication status within its cache.

In an aspect, the remote authentication device can include one or a combination of a remote server, a Remote Authentication Dial-in User Service (RADIUS) server, Terminal Access Controller Access-Control System (TACACS) server and a Lightweight Directory Access Protocol (LDAP) server. In another aspect, the authentication request can include a Media Access Control (MAC) address of the wireless client device. In yet another aspect, the remote authentication device can store therein, information associating the MAC address of the wireless client device with the current authentication status of the wireless client device. In another aspect, the cache can stored therein, information associating the MAC address of the wireless client device with the prior authentication result. In yet another aspect, the authentication request can include a network access identifier indicative of a device signature of the wireless client device.

According to one embodiment, a wireless network controller is provided having a client request receive module configured to receive an authentication request relating to a wireless client device from a wireless access point (AP) coupled to a wireless local area network (WLAN) and managed by the wireless network controller. The wireless network controller can further include a cache memory containing therein prior authentication statuses for multiple wireless client devices, and an in-cache authentication status determination module configured to determine whether a prior authentication status of the wireless client device is present in the cache. The wireless network controller can further include a cache-based authentication module configured to permit the wireless client device to access the WLAN via the AP when the prior authentication status is present and indicates the wireless client device was previously successfully authenticated. The wireless network controller can further include a remote server based authentication module configured to issue the authentication request to a remote authentication device associated with the WLAN to determine a current authentication status of the wireless client device and receive and store the current authentication status of the wireless client device within the cache.

According to one embodiment, when the current authentication status represents a successful authentication of the wireless client device, the network controller can be configured to continue to allow the wireless client device to access the WLAN via the AP. On the other hand, when the current authentication status represents an unsuccessful authentication of the wireless client device, then the network controller can be configured to revoke access to the WLAN by the Wireless client device via the AP.

In an aspect of the present disclosure, the authentication request can include a Media Access Control (MAC) address of the wireless client device. In another aspect, the remote authentication device has stored therein information associating the MAC address of the wireless client device with the current authentication status of the wireless client device. In yet another aspect, the cache has stored therein information associating the MAC address of the wireless client device with the prior authentication result. In yet another aspect, the authentication request can include a network access identifier indicative of a device signature of the wireless client device.

FIG. 1 illustrates an exemplary wireless network architecture 100 in accordance with an embodiment of the present invention. As illustrated, architecture 100 of FIG. 1 can include one or more access points such as access point-1 104-1, access point-2 104-2, and access point-3 104-3, which may be collectively and interchangeably referred to as access point (AP) 104 hereinafter, which are configured to provide wireless connectivity to one or more wireless client devices, such as client device 102-1, 102-2, and so on, which may be collectively referred to as client device(s) 102 hereinafter.

In an aspect, each AP 104 can be operatively coupled with a wireless network controller, such as wireless network controller 106, to enable a client device 102 to access a desired network resource (not shown). In another aspect, network controller 106, APs 104, and client devices 102 can form part of a wireless Local Area Network (WLAN), wherein the network resource being accessed can either be part of the WLAN or can be external to same. According to one embodiment, before accessing a network resource, client device 102 can be expected to be authenticated by controller 106 to determine whether device 102 should be allowed access to the requested resource. Such authentication can be enabled by means of one or more remote authentication devices, such as LDAP server 108-1, remote server 108-2, or RADIUS server 108-3, which may be collectively and interchangeably referred as remote authentication device 108 hereinafter, which can be configured to authenticate one or more client devices 102 attempting to access a resource, wherein the remote authentication device 108 can be configured to provide and update current authentication status of each device by, maintaining the authentication status along with the MAC address of one or more stored/registered/applicable client devices 102.

As illustrated, each AP 104 can be configured to provide wireless connectivity to a WLAN to one or more client devices 102 that are within range. For instance, access point-1 104-1 can provide wireless access to client device 102-1, client device 102-2, client device 102-3, and client device 102-4. Similarly, access point-2 104-2 can provide wireless access to client device 102-5, client device 102-6, client device 102-7, and client device 102-8, and so on. In an example implementation, network controller 106 can be operatively coupled with APs 104 using a wireless interface and/or through a wired interface.

In an example implementation, wireless network controller 106 can receive an authentication request relating to a wireless client device 102 from a wireless AP 104 managed by wireless network controller 106, and can determine whether a prior authentication result associated with wireless client device 102 is present in a cache of wireless network controller 106. In this manner, controller 106 can permit wireless client device 102 to access the WLAN via the AP 104 when the prior authentication result is present in the cache of wireless network controller 106, allowing fast authentication to take place and reducing delay that would otherwise be experienced by client device 102 to access the desired network resource. Further, as security policies may have changed since the time of the prior authentication result, wireless network controller 106 can issue the authentication request to a remote authentication device 108 associated with the WLAN to determine a current authentication status of wireless client device 104 and then receive the current authentication status of wireless client device 102 from remote authentication device 108 in order to update/store the current authentication status within the cache of wireless network controller 106. When the current authentication status indicates client device 102 has been successfully authenticated, wireless network controller 106 permits continued access to the WLAN by client device 102; however, when the current authentication status indicates an authentication failure or otherwise indicates client device 102 should be denies access to the WLAN in general or the network resource, in particular, wireless network controller 106 can direct AP 104 to no longer provide client device 102 connectivity to the WLAN. By such means, systems and methods of the present disclosure can enable fast roaming of client device 102 by locally authenticating the client device 102 at the wireless network controller 106, thereby avoiding delays associated with re-authentication via remote authentication device 108 when client device 102 is being handed off from one AP to another within the WLAN.

As mentioned above, in an example implementation, if the current authentication status received from remote authentication device 108 by wireless network controller 106 represents a successful authentication of wireless client device 102, wireless network controller 106 can renew the current authentication status within the cache and allow wireless client device 102 to remain connected to the WLAN via AP 104. On the other hand, if the current authentication status received from remote authentication device 108 by the wireless network controller 106 represents an unsuccessful authentication of wireless client device 104, wireless network controller 106 may direct AP 104 to immediately revoke access to the WLAN by wireless client device 102.

According to an example implementation, authentication can be based on the MAC address of client device 102, which may be referred to as MAC authentication hereinafter. In an aspect, wireless network controller 106 can authenticate one or more client devices 102 based on their respective MAC addresses, against which wireless network controller 106 stores a most recent prior authentication status in the cache, wherein the cache may be internal and/or external to controller 106. Multi-level caches can also be configured to enable storage of authentication information across one or more layers based on the type of authentication request, client device 102 in context, the resource being accessed, priority of such access, among other like attributes/factors/parameters.

According to one aspect of the present disclosure, the authentication request received by the wireless network controller 106 can include a network access identifier (e.g., a MAC address) uniquely identifying wireless client device 102 within the WLAN. According to one aspect of the present disclosure, the authentication status stored within the cache of wireless controller 106 or determined by remote authentication server 108 can be associated with the network access identifier.

In an example implementation, when the prior authentication result is not present within the cache of wireless network controller 106, a connection request by client device 102 to connect to WLAN via AP 104 can be put on hold or can be delayed until a current authentication status can be obtained from remote authentication device 108. For example, an authentication request can be issued by network controller 106 to remote authentication device 108 to determine the current authentication status of wireless client device 102. The remote authentication device 108 can authenticate the client device 102 based on its MAC address alone, or in combination with other credential verification, and send the current authentication status that represents whether the authentication request was successful or unsuccessful. Wireless network controller 106, after receiving the current authentication status from remote authentication device, can permit or deny the connection request of wireless client device 102 to access the WLAN via AP 104. Network controller 106 can permit or deny the connection request from wireless client device 102 based on the current authentication status received from remote authentication device 108. For instance, if the current authentication status represents successful authentication of wireless client device 102, wireless network controller 106 can permit wireless client device 102 to connect to the WLAN via AP 104 and the authentication status of wireless client device 102 can be created/updated within a cache record of network controller 106. On the other hand, if the current authentication status represents an unsuccessful authentication of wireless client device 102, the controller 106 can de-authenticate wireless client device 102 or otherwise deny the request of wireless client device 102 to connect to the WLAN via AP 104 and update its cache accordingly.

As illustrated above, prior authentication results associated with client devices 102 and stored in a cache associated with network controller 106 may be used for temporary/fast authentication of client device 102 thereby enabling fast/efficient roaming among APs of the WLAN. This allows client devices 102, using real-time applications, such as audio/video streaming, audio/video calls, financial transactions and the like, to avoid facing authentication-based interruption/delays when moves from the coverage area of one AP to another (e.g., from access point 104-1 to access point 104-2).

According to one embodiment, the current authentication status can be provided by a remote authentication device 108, such as a Remote Authentication Dial-in User Service (RADIUS) server 108-3, or by a Terminal Access Controller Access-Control System (TACACS) server, or by a Lightweight Directory Access Protocol (LDAP) server 108-1, or by any remote authentication server that can be configured to provide authentication in addition to other authentication methods, such as OPEN, WPA-personal and WPA-enterprise. Those skilled in the art will appreciate that there may be one or more network controllers 106 for controlling access of client devices 102 to WLAN via APs 104. A network controller 106 can be provided with one or more redundant wireless network controllers 106, wherein a standby controller (not shown) can take over the functionality of network controller 106 when controller 106 fails for any reason. The cache of controller 106 can also be synchronized with such redundant/standby controller to enable seamless transition from one controller to another. The current authentication status associated with one or more client device 102 (or MAC address) can therefore be synchronized between network controller 106 and the redundant wireless network controllers.

Figures 2A, 2B:
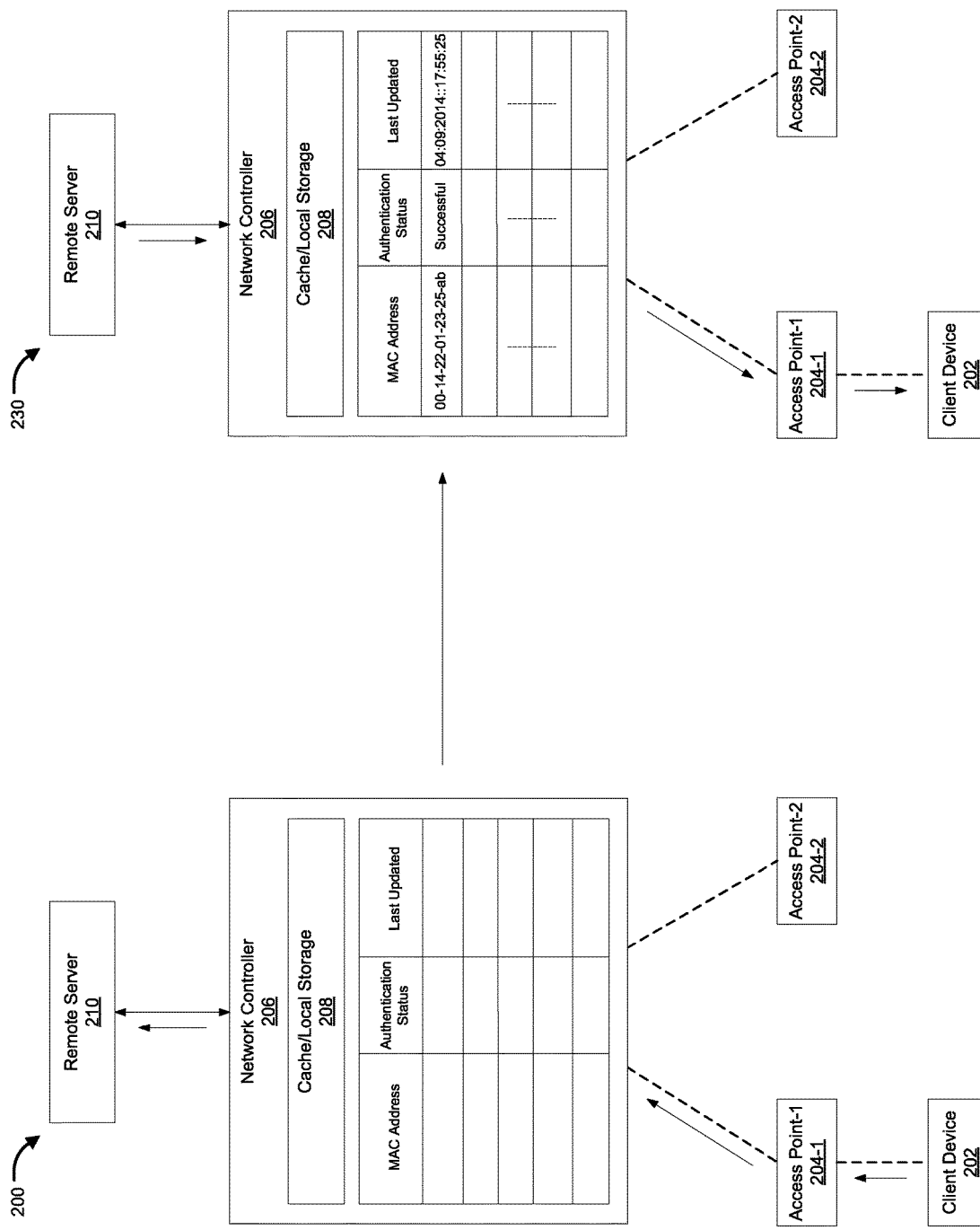
FIGS. 2A-2C conceptually illustrate network controller cache-based client device authentication in accordance with an embodiment of the present disclosure.
Figure 2C:
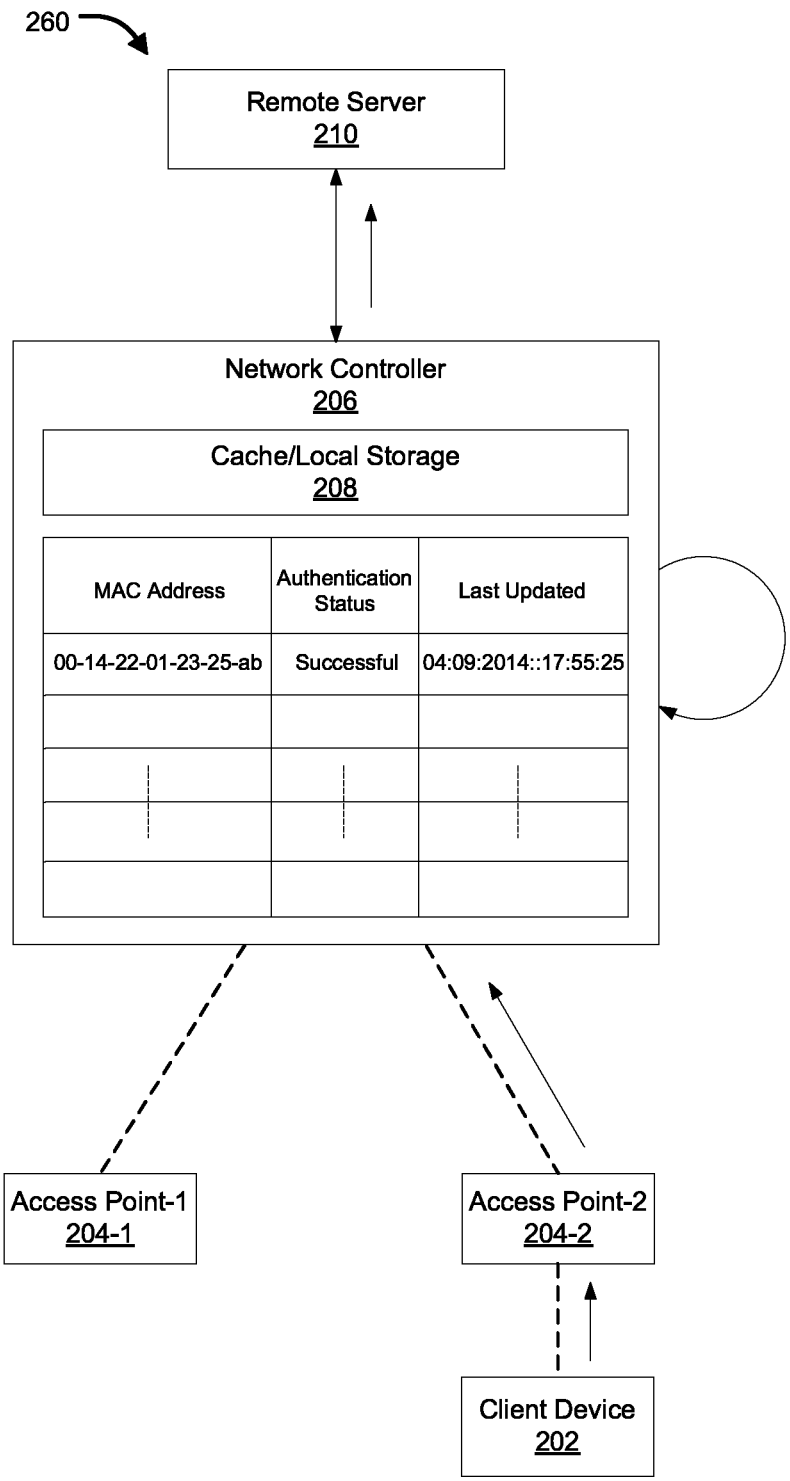

FIGS. 2A-2C illustrate exemplary cache-based client device authentication by a wireless network controller 206 in accordance with an embodiment of the present disclosure. In the context of the present example, wireless network controller 206, which may be interchangeably referred to herein as network controller 206, manages access point-1 204-1 and access point-2 204-2 and is operatively coupled with a cache or a local storage 208. Although in the current example cache 208 is illustrated as part of controller 206, it can actually be stored/configured external to controller 206 and can be a multi-level (L1, L2, etc.) hierarchical based structure. In an aspect, cache 208 can be configured to store a prior authentication result of one or more client devices, such as client device 202.

According to one embodiment, controller 206 can be operatively coupled with an authentication server 210, which may be remotely located, and hence may be referred to herein as a remote server 210. As mentioned above, when a prior authentication result for client device 102 is present in cache 208, network controller 206 can be configured to locally authenticate client device 102, connected via say access point-1 204-1. Concurrently with, prior to or after performing the local authentication check by way of cache 208, the authentication request from client device 202 can be forwarded to remote server 210. Based on the authentication status received from remote server 210, client device 202 can either be allowed to continue to access to the WLAN/resource or can be denied access and the current authentication status can be updated in cache 208. In an exemplary implementation, network controller 206 maintains a mapping of the current (last known) authentication status associated with client device 202 against its MAC address in the form of a database, a table or the like. In the context of the present example, cache 208 is conceptually illustrated in the form of a table, which may have fields including, but not limiting to, the MAC address of the client device, current authentication status as received from remote server 210, and a timestamp of the last update received from remote server 210.

FIG. 2A illustrates a scenario 200 in which there is no prior authentication record present for client device 202 in cache/local storage 208 of controller 206. In such a case, when client device 202 makes a connection/authentication request via AP 204-1, network controller 206 may forward the connection/authentication request to remote server 210 in order to determine the current authentication status of client device 202. Upon receiving the current authentication status from remote server 210, network controller 206 may direct AP 204-1 to permit or deny client device 202 access to the WLAN based on the current authentication status received from remote server 210. In an example implementation, if the current authentication status received by network controller 206 from remote server 210 represents a successful authentication, network controller 206 can permit client device 202 to connect to the WLAN via AP 204 and a record can be created/stored for client device 202 within cache/local storage 208. On the other hand, if the current authentication status received by network controller 206 from remote server 210 represents an unsuccessful authentication, network controller 206 can deny the request of the client device 202 to connect to the WLAN via AP 204 and a record can be created within cache/local storage 208 that reflects the unsuccessful authentication. In an alternate embodiment, controller 206 may not create records within cache 208 for unsuccessful authentications and therefore when a record is present it is because client device 202 was previously successfully authenticated.

In one embodiment, client device 202 is periodically re-authenticated. For example, network controller 206 can be configured to automatically receive or request a current authentication status associated with one or more of those of client devices 202 that are currently connected to the WLAN from remote server 210 at periodic intervals, say every 5 minutes. As noted above, in a WLAN with multiple controllers 206, the active controller's cache can be synchronized with the caches of other controllers in real-time to facilitate graceful failover.

FIG. 2B illustrates caching of current authentication status against MAC address of client device 202 for enabling temporary and quick authentication of the client device 202 when it tries to connect with the WLAN that is managed by the controller 206. FIG. 2B represents a state of cache/local storage 208 after a first successful authentication of client device 202 by remote server 210. In such a case, cache/local storage 208 can have an entry associated with client device 202 having MAC address (i.e., 00-14-22-01-23-25 in the present example) showing that it was successfully authenticated and the time and date associated with the authentication status. On receipt of every new update from remote server 210, the authentication status and timestamp can be updated in cache/local storage 208. In an aspect, multiple entries for the same client device 202 can be created to maintain a log of prior authentication status, or alternatively the current authentication status can replace/overwrite the prior authentication status so that only the latest status is stored in cache 208. According to one embodiment, cache entries of cache/local storage 208 may expire and be removed from cache/local storage 208 after a predetermined or configurable amount of time or responsive to a de-authentication or network access denial event associated with the MAC address at issue or a change to security policies within remote server 210.

FIG. 2C illustrates a scenario where the client device 202 moves from AP 204-1 to AP 204-2 and has been previously successfully authenticated by remote server 210. In such a case, as the prior authentication result (indicating a previous successful authentication) is stored within cache/local storage 208. As such, when client device 202 makes a connection/authentication request to access the WLAN via AP 204-2, it can be quickly and efficiently locally authenticated (shown through the round arrow) and permitted access. Network controller 206 can concurrently forward the authentication request to remote server 210 to obtain a current authentication status. When the current authentication status is successful, client device 202 can be allowed to continue to remain connected to the WLAN; otherwise, if the current authentication status returned from remote server 210 is unsuccessful, then client device 202 can be de-authenticated or otherwise denied access to the WLAN and/or to the network resource. Those skilled in the art will appreciate that the authentication request in question may be general (e.g., access to the WLAN) or specific (e.g., access to a specific network resource) that may require separate or additional authentication. Those skilled in the art will appreciate that the local authentication performed by network controller 206 may be temporary or preliminary in nature as network security policies, in general, and permissions for the particular client device 202 or the user of the particular client device 202, in particular, may have changed since the prior successful authentication. As such, while network controller 206 may allow client device 202 to connect to the WLAN via AP 204-2 when a prior successful authentication record is found in cache/local storage 208, network controller 206 may be configured to concurrently request a current authentication status from remote server 210 in the background. If the current authentication status for client 202 returned by remote server 210 indicates an authentication failure, then network controller 206 may cause client device 202 to be de-authenticated or otherwise denied access to the WLAN.

Figure 3:
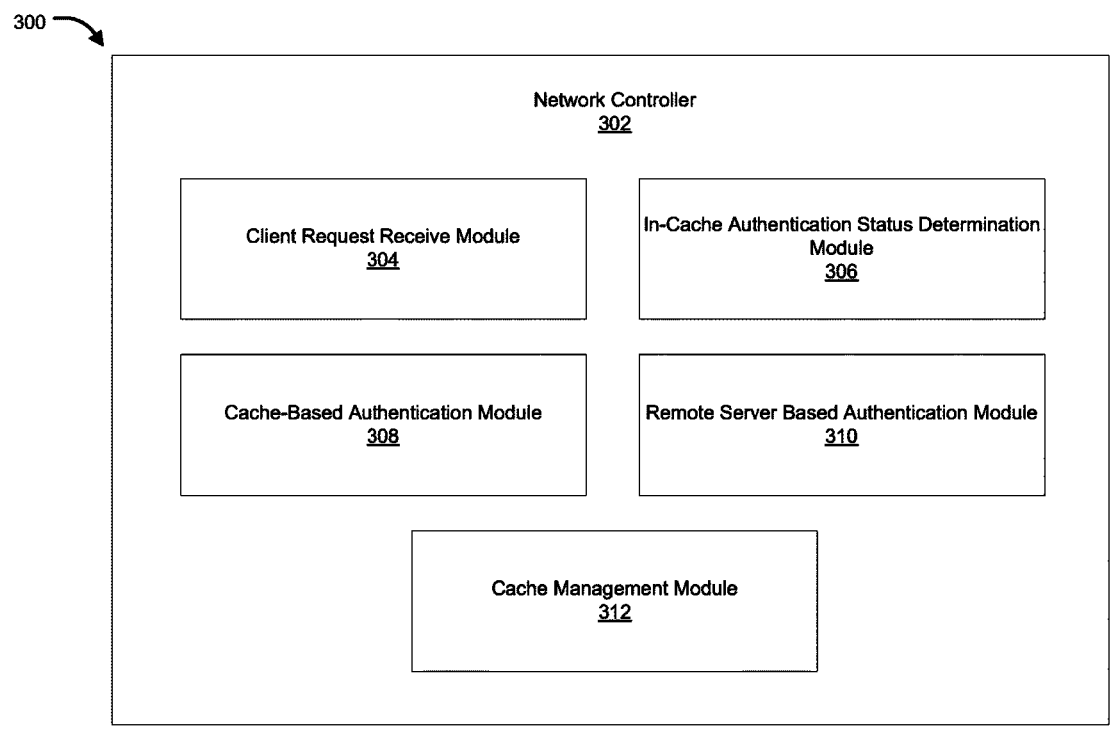
FIG. 3 illustrates exemplary functional modules of a client authentication system in accordance with an embodiment of the present disclosure.

FIG. 3 illustrates exemplary functional modules 300 of a client device authentication system in accordance with an embodiment of the present disclosure. In the context of the present example, client authentication system can be implemented as part of a wireless network controller 302 that can provide authentication of one or more client devices attempting to connect to WLAN or to access one or more network resources via an AP. In an exemplary embodiment, network controller 302 can include a client request receive module 304, an in-cache authentication status determination module 306, a cache-based authentication module 308, a remote server-based authentication module 310, and a cache management module 312. Network controller 302 can be used for fast, local client authentication to facilitate efficient roaming of one or more client devices among APs of the WLAN.

According to one embodiment, client request receive module 304 can be configured to receive an authentication request relating to a wireless client device from a wireless AP coupled to a WLAN and that is managed by the wireless network controller 302. In an instance, every time a client device attempts to connect to the WLAN through an AP that is managed by the controller 302, or when the client device changes its location from a first AP to a second AP, the client device may be required to send an authentication request, including, for instance, its MAC address or any other device identifier, to the controller 302. A client request receive module 304 can be configured to receive such authentication request from the AP to which the client device is connected.

According to one embodiment, the in-cache authentication status determination module 306 can be configured to determine whether a prior authentication result/record for the client device is available in a cache/local storage of network controller 302. In an exemplary embodiment, a prior authentication result/record may be present within the cache/locate storage of controller 302 if the client device was previously authenticated by the controller 302, or if the network controller 302 otherwise received an authentication status associated with the client from a remote authentication server. In an example implementation, authentication records associated with one or more client devices with their respective current authentication statuses and timestamps can be stored within a cache memory of network controller 302. The in-cache authentication status determination module 306 can therefore determine whether an authentication record associated with the requesting client device is available within the cache of network controller 302, for example, by performing a lookup based on the client device's MAC address or issuing a suitable query based on the MAC address. When no authentication record is present in the cache, the authentication request can be forwarded by controller 302 to a remote authentication server; otherwise the authentication request can be initially processed locally by controller 302 based on the existing cache record.

According to one embodiment, cache based authentication module 308 can be configured to temporarily authenticate the requesting client device based on an affirmative response from in-cache authentication status determination module 306 that confirms the presence of authentication record with a successful authentication status associated with the requesting client device. Cache-based authentication module 302 can be configured to permit the wireless client device to access the WLAN via the AP when the prior authentication status is present and indicates the wireless client device was previously successfully authenticated. On the other hand, in case the cache record indicates the prior authentication result was unsuccessful, controller 302 can deny the client device access to the WLAN and/or to the requested network resource. Furthermore, regardless of whether an authentication record exists within the cache and regardless of the prior authentication status, network controller 302 can be configured to request a current authentication status associated with the requesting client device in from a remote authentication server.

According to one embodiment, the remote server based authentication module 310 can be configured to enable network controller 302 to issue an authentication request to a remote authentication server associated with the WLAN in order to determine a current authentication status of the client device, and can further be configured to enable network controller 302 to receive the current authentication status of the client device in order to store/update the current authentication status within a cache/local storage of network controller 302. In an example implementation, if the current authentication status received from the remote authentication server by the network controller 302 represents a successful authentication of the requesting client device in context, the network controller 302 can renew/update the client device authentication at cache and let the client device continue the connection with WLAN. On the other hand, if the current authentication status received from remote authentication server by the network controller 302 represents an unsuccessful authentication of client device in context, the AP can immediately revoke access of the client device to the WLAN and also update the cache accordingly so that the device is not authentically by local authentication by the controller's cache.

According to another embodiment, cache management module 312 can be configured to add, edit and/or update authentication records associated with one or more client devices as current authentication status information is received from the applicable remote authentication server(s) or from another network controller. In an exemplary implementation, if the current authentication status is not updated for a predetermined or configurable amount of time, cache management module 312 can remove the authentication record from the cache or otherwise mark it for deletion. Controller's cache can also be configured to be periodically updated by the remote authentication server. In another embodiment, controller 302 can also be configured to locally authenticate a client device based on device attributes such as user in context, previous authentication history, the network resource at issue, user attributes such role/responsibility, determination of whether the device is registered or not, determination of whether the device is internal to the WLAN or accessing the WLAN from outside, among other like parameters.

Those skilled in the art will appreciate that any network element can be configured to provide the cache-based authentication using the modules as described above. Therefore, it is to be appreciated that use of AP and network controller are completely exemplary in nature and any other structure/configuration/construction is completely within the cope of the present disclosure. For instance, such local authentication can be performed at a gateway device. Alternatively, the APs can be directly connected with one or more authentication servers/devices without any need of network controllers playing a role in between and each AP can be associated with a cache that is shared amongst multiple APs. All such configurations are therefore within the scope of the present disclosure. Also, any other module, sub-module, component, sub-component can be introduced herein, all of which are completely within the scope of the present disclosure.

Figure 4:
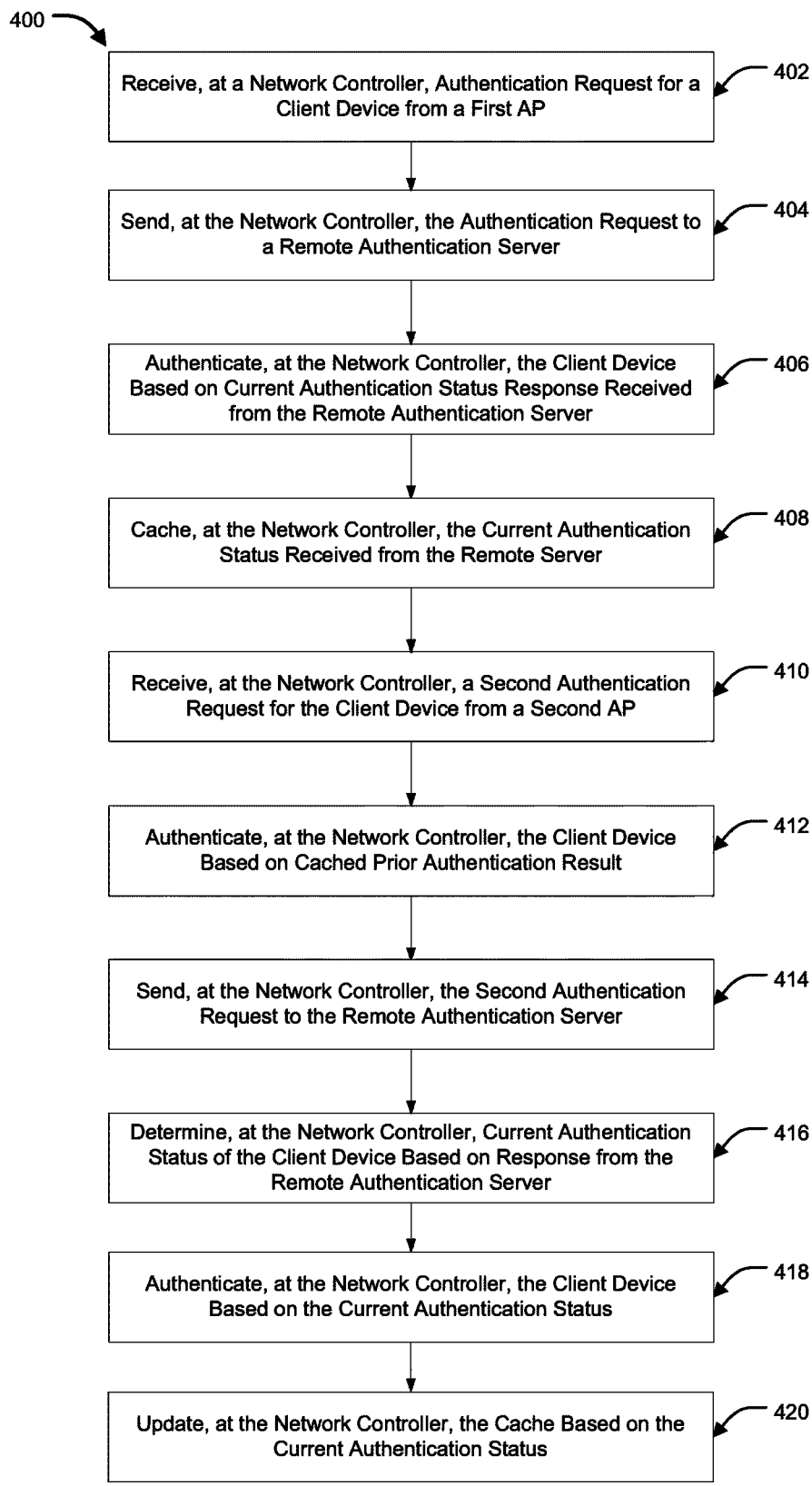
FIG. 4 is an exemplary flow diagram illustrating client device authentication processing in accordance with an embodiment of the present disclosure.

FIG. 4 illustrates an exemplary flow diagram 400 illustrating client device authentication processing in accordance with an embodiment of the present disclosure. At step 402, a network controller receives an authentication request for a client device from a first AP. Assuming that there is no prior authentication result/record available within the cache of the network controller, at step 404, the network controller can send the authentication request to a remote server to provide a current authentication status associated with the client device. At step 406, the network controller can authenticate the client device based on the current authentication status received from the remote server such that if the current authentication status indicates successful authentication, the client device is allowed access to the WLAN or resources therein; otherwise, if the current authentication status is unsuccessful, the client device can be denied access to the WLAN or otherwise be de-authenticated.

At step 408, the network controller caches the current authentication status received from the authentication device/server within the cache that is operatively coupled to/managed by and/or integrated within the controller. At step 410, the network controller can receive a second authentication request from the client device through a second AP, wherein at step 412, the controller can locally/initially authenticate the client device based on the cached prior authentication result and then at 414, the controller forwards the second authentication request to the remote server. At step 416, the controller determines the current authentication status of the client device based on the response from the remote server, based on which, at step 418, the controller takes action based on the current authentication status such that if the current authentication status is successful, the client device can be allowed to continue be a part of the WLAN or access the network resource; otherwise, if the current authentication status is unsuccessful, the initially allowed access can be revoked. At step 420, the current authentication status can also be used to update the current entry in the cache of the controller so as to contain the most recent authentication status for the client device.

Figure 5:
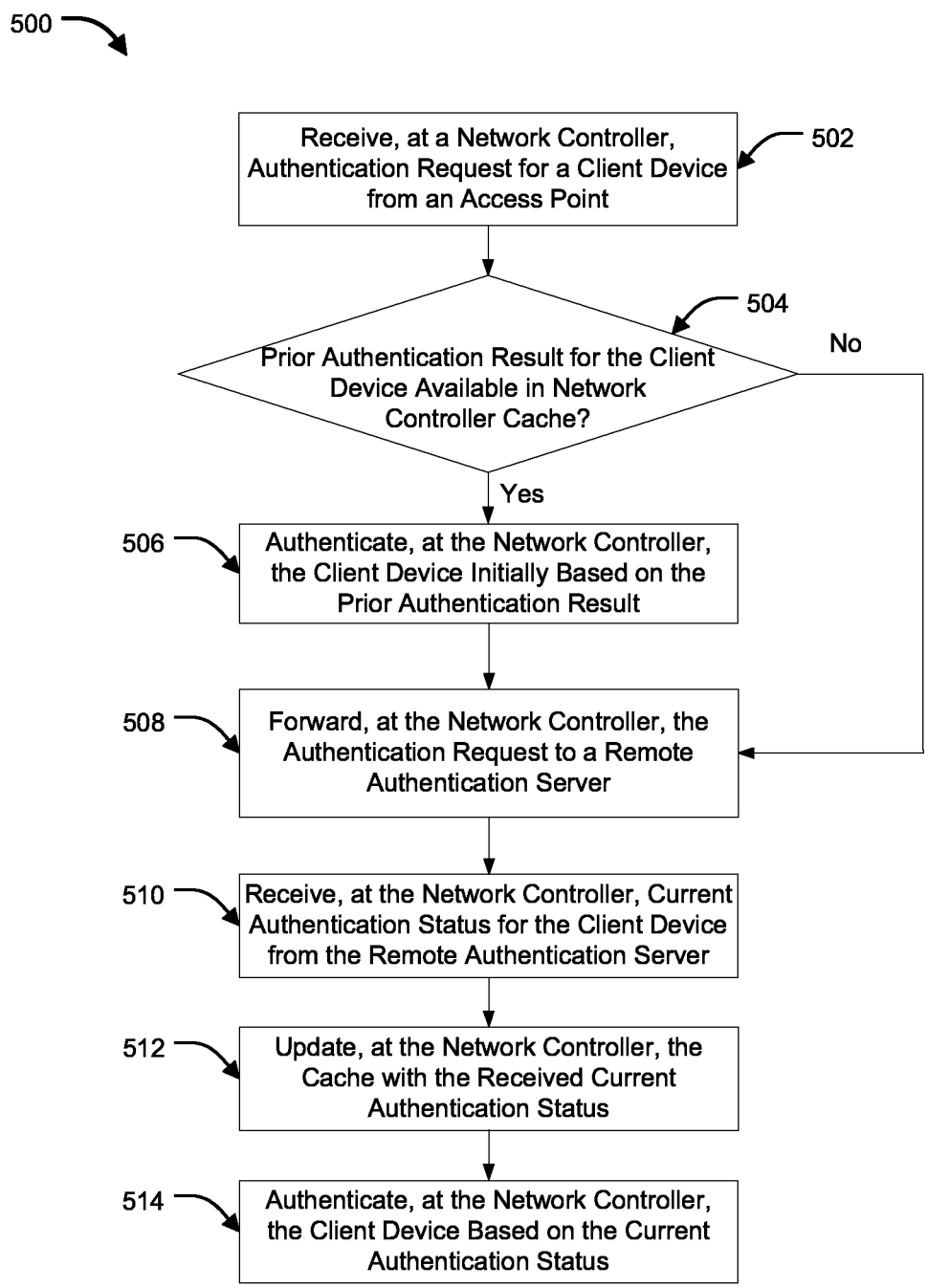
FIG. 5 is another exemplary flow diagram illustrating client device authentication in accordance with another embodiment of the present disclosure.

FIG. 5 is another exemplary flow diagram 500 illustrating client device authentication in accordance with another embodiment of the present disclosure. As shown in FIG. 5, at step 502, a network controller receives authentication request for a client device from an access point (AP). Responsive to receiving the authentication request from the AP, at step 504, the network controller determines whether any prior authentication result associated with the client device in context is available in network controller's cache. If a prior authentication result is available within the cache, the client device is initially/temporarily authenticated, at step 506, based on the cached prior authentication result. When no prior authentication result is available within the cache, the process branches to step 508, where the authentication request is forwarded to a remote authentication device/server. At step 510, the response from the remote authentication server is received by the controller in the form of a current authentication status, based on which, at step 512, the cache can be updated, and at step 514, the client device can be re-authenticated such that if the current authentication status is successful, the client device can be allowed to continue access of the requested resource else, if the current authentication status is unsuccessful, the client device can be denied access.

Figure 6:
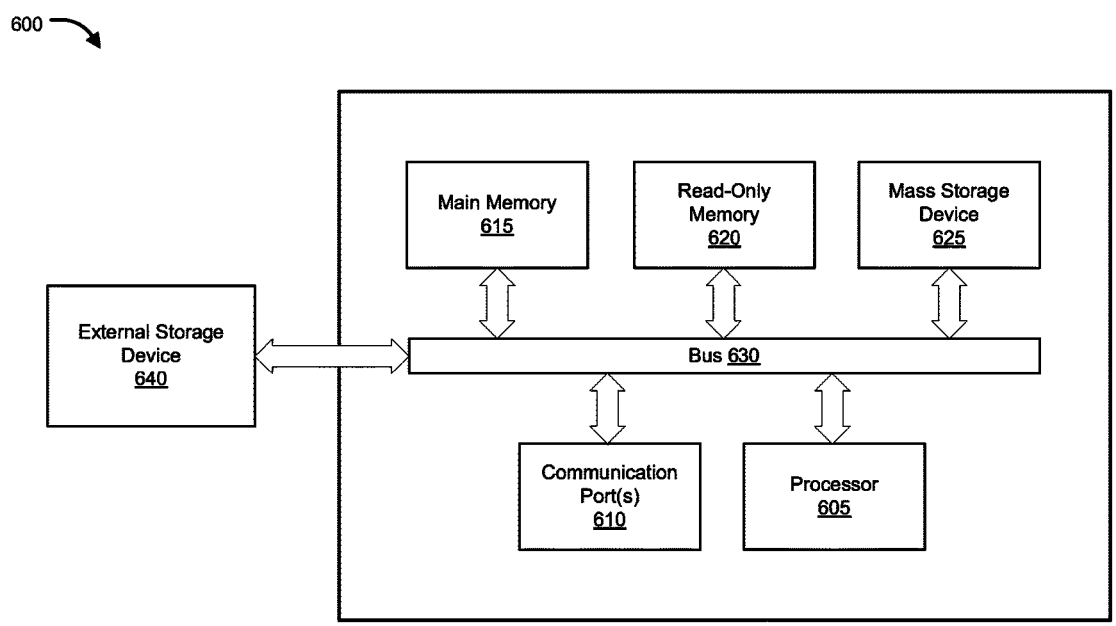
FIG. 6 is an exemplary computer system in which or with which embodiments of the present invention may be utilized.

FIG. 6 is an example of a computer system 600 with which embodiments of the present disclosure may be utilized. Computer system 600 may represent or form a part of a wireless network controller that manages one or more APs of a WLAN and that performs cache-based authentication of wireless client devices.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 600 includes a bus 630, a processor 605, communication port 610, a main memory 615, a removable storage media 640, a read only memory 620 and a mass storage 625. A person skilled in the art will appreciate that computer system 600 may include more than one processor and communication ports.

Examples of processor 605 include, but are not limited to, an Intel® Itanium® or Itanium 2 processor(s), or AMD®, Opteron® or Athlon MP® processor(s), Motorola® lines of processors, FortiSOC™ system on a chip processors or other future processors. Processor 605 may include various modules associated with monitoring unit as described in FIGS. 2-4. Communication port 610 can be any of an RS-232 port for use with a modem based dialup connection, a 10/100 Ethernet port, a Gigabit or 10 Gigabit port using copper or fiber, a serial port, a parallel port, or other existing or future ports. Communication port 610 may be chosen depending on a network, such a Local Area Network (LAN), Wide Area Network (WAN), a WLAN or any network to which computer system 600 connects.

Memory 615 can be Random Access Memory (RAM), or any other dynamic storage device commonly known in the art. Read only memory 620 can be any static storage device(s) such as, but not limited to, a Programmable Read Only Memory (PROM) chips for storing static information such as start-up or BIOS instructions for processor 605.

Mass storage 625 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 630 communicatively couples processor(s) 605 with the other memory, storage and communication blocks. Bus 630 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 605 to system memory.

Optionally, operator and administrative interfaces, such as a display, keyboard, and a cursor control device, may also be coupled to bus 630 to support direct operator interaction with computer system 600. Other operator and administrative interfaces can be provided through network connections connected through communication port 610.

Removable storage media 640 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

What is claimed is:

1. A method of reducing delays associated with authentication of a previously authenticated wireless client device roaming between two wireless access points (APs) of a plurality of APs of a wireless local area network (WLAN) that are managed by a wireless network controller, the method comprising:
    maintaining, by the wireless network controller, a cache containing a plurality of media access control (MAC) addresses of a plurality of wireless client devices and corresponding prior authentication results previously issued by a remote authentication device responsive to authentication requests initiated by the plurality of wireless client devices and relayed by one or more of the plurality of APs to the remote authentication device;
    receiving, by the wireless network controller, an authentication request relating to a wireless client device from an AP of the plurality of APs;
    determining, by the wireless network controller, whether a prior authentication result associated with the wireless client device is present in the cache of the wireless network controller;
    when the prior authentication result is present in the cache and indicates the wireless client device was previously successfully authenticated for access to the WLAN by the remote authentication device:
        permitting, by the wireless network controller, the wireless client device to access the WLAN via the AP;
        issuing, by the wireless network controller, the authentication request to a remote authentication device, which is distinct and separate from the wireless network controller and associated with the WLAN, to determine a current authentication status of the wireless client device;
        receiving, by the wireless network controller, the current authentication status of the wireless client device from the remote authentication device;
        storing, by the wireless network controller, information regarding the current authentication status within the cache.

2. The method of claim 1, further comprising when the current authentication status represents a successful authentication of the wireless client device, then continuing to allow the wireless client device to access the WLAN via the AP.

3. The method of claim 1, further comprising when the current authentication status represents an unsuccessful authentication of the wireless client device, then revoking access to the WLAN by the wireless client device via the AP.

4. The method of claim 1, further comprising when the prior authentication result is not present in the cache:
    issuing, by the wireless network controller, the authentication request to the remote authentication device to determine the current authentication status of the wireless client device;
    delaying permitting or denying, by the wireless network controller, access to the WLAN by the wireless client device until after a response to the authentication request is received from the remote authentication device;
    receiving, by the wireless network controller, the current authentication status of the client device from the remote authentication device;
    permitting, by the wireless network controller, the wireless client device to access the WLAN via the AP when the current authentication status indicates the wireless client device was successfully authenticated;
    denying, by the wireless network controller, the wireless client device access to the WLAN via the AP when the current authentication status indicates the wireless client device was unsuccessfully authenticated; and
    storing, by the wireless network controller, the current authentication status within the cache.

5. The method of claim 1, wherein the remote authentication device comprises one or a combination of a remote server, a Remote Authentication Dial-in User Service (RADIUS) server, Terminal Access Controller Access-Control System (TACACS) server and a Lightweight Directory Access Protocol (LDAP) server.

6. The method of claim 1, wherein the authentication request includes a Media Access Control (MAC) address of the wireless client device.

7. The method of claim 1, wherein the authentication request includes a network access identifier indicative of a device signature of the wireless client device.

8. A non-transitory computer-readable storage medium embodying a set of instructions, which when executed by one or more processors of a wireless network controller that manages a plurality of wireless access points (APs) of a wireless local area network (WLAN), cause the one or more processors to perform a method for reducing delays associated with authentication of a previously authenticated wireless client device roaming between two APs of the plurality of APs, the method comprising:
    maintaining a cache containing a plurality of media access control (MAC) addresses of a plurality of wireless client devices and corresponding prior authentication results previously issued by a remote authentication device responsive to authentication requests initiated by the plurality of wireless client devices and relayed by one or more of the plurality of APs to the remote authentication device;

receiving an authentication request relating to a wireless client device from an AP of the plurality of APs;

determining, by the wireless network controller, whether a prior authentication result associated with the wireless client device is present in the cache of the wireless network controller;

when the prior authentication result is present in the cache and indicates the wireless client device was previously successfully authenticated for access to the WLAN by the remote authentication device:

permitting the wireless client device to access the WLAN via the AP;

issuing the authentication request to a remote authentication device, which is distinct and separate from the wireless network controller and associated with the WLAN, to determine a current authentication status of the wireless client device;

receiving the current authentication status of the wireless client device from the remote authentication device;

storing information regarding the current authentication status within the cache.

9. The non-transitory computer-readable storage medium of claim 8, wherein the method further comprises when the current authentication status represents a successful authentication of the wireless client device, then continuing to allow the wireless client device to access the WLAN via the AP.

10. The non-transitory computer-readable storage medium of claim 8, wherein the method further comprises when the current authentication status represents an unsuccessful authentication of the wireless client device, then revoking access to the WLAN via the AP.

11. The non-transitory computer-readable storage medium of claim 8, wherein the method further comprises when the prior authentication result is not present in the cache:

issuing the authentication request to the remote authentication device to determine the current authentication status of the wireless client device;

delaying permitting or denying access to the WLAN by the wireless client device until after a response to the authentication request is received from the remote authentication device;

receiving the current authentication status of the client device from the remote authentication device;

permitting the wireless client device to access the WLAN via the AP when the current authentication status indicates the wireless client device was successfully authenticated;

denying the wireless client device access to the WLAN via the AP when the current authentication status indicates the wireless client device was unsuccessfully authenticated; and storing the current authentication status within the cache.

12. The non-transitory computer-readable storage medium of claim 8, wherein the remote authentication device comprises one or a combination of a remote server, a Remote Authentication Dial-in User Service (RADIUS) server, Terminal Access Controller Access-Control System (TACACS) server and a Lightweight Directory Access Protocol (LDAP) server.

13. The non-transitory computer-readable storage medium of claim 8, wherein the authentication request includes a Media Access Control (MAC) address of the wireless client device.

* * * * *